(12) United States Patent
Hao et al.

(10) Patent No.: US 7,921,363 B1
(45) Date of Patent: Apr. 5, 2011

(54) APPLYING DATA THINNING PROCESSING TO A DATA SET FOR VISUALIZATION

(75) Inventors: Ming C. Hao, Palo Alto, CA (US); Umeshwar Dayal, Saratoga, CA (US); Nimesh Patel, North Brunswick, NJ (US); Patrick A. Autilio, Cranford, NJ (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 965 days.

(21) Appl. No.: 11/796,817

(22) Filed: Apr. 30, 2007

(51) Int. Cl.
*G06F 17/00* (2006.01)
*G06T 17/00* (2006.01)
*G09G 5/00* (2006.01)

(52) U.S. Cl. ......... 715/273; 715/275; 345/428; 345/581
(58) Field of Classification Search ................. 715/243, 715/255, 273, 275; 345/428, 581
See application file for complete search history.

(56) References Cited

U.S. PATENT DOCUMENTS

| | | | |
|---|---|---|---|
| 3,487,308 A | 12/1969 | Johnson | |
| 5,581,797 A | 12/1996 | Baker et al. | |
| 5,588,117 A | 12/1996 | Karp et al. | |
| 5,608,904 A | 3/1997 | Chaudhuri et al. | |
| 5,623,590 A | 4/1997 | Becker et al. | |
| 5,623,598 A | 4/1997 | Voigt et al. | |
| 5,634,133 A | 5/1997 | Kelley | |
| 5,659,768 A | 8/1997 | Forbes et al. | |
| 5,694,591 A | 12/1997 | Du et al. | |
| 5,742,778 A | 4/1998 | Hao et al. | |
| 5,757,356 A | 5/1998 | Takasaki et al. | |
| 5,801,688 A | 9/1998 | Mead et al. | |
| 5,828,866 A | 10/1998 | Hao et al. | |
| 5,844,553 A | 12/1998 | Hao et al. | |
| 5,878,206 A | 3/1999 | Chen et al. | |
| 5,903,891 A | 5/1999 | Chen et al. | |
| 5,924,103 A | 7/1999 | Ahmed et al. | |
| 5,940,839 A | 8/1999 | Chen et al. | |
| 5,986,673 A | 11/1999 | Martz | |
| 5,999,193 A | 12/1999 | Conley, Jr. et al. | |
| 6,052,890 A | 4/2000 | Malagrino, Jr. et al. | |
| 6,115,027 A | 9/2000 | Hao et al. | |
| 6,144,379 A | 11/2000 | Bertram et al. | |

(Continued)

FOREIGN PATENT DOCUMENTS

EP 0778001 11/1996

OTHER PUBLICATIONS

Hao et al., "Visualization of High-Density 3D Graphs Using Non-Linear Visual Space Transformations", Published in and presented at the SPIE Conference on Visualization and Data Analysis, Jan. 20-25, 2002, San Jose, CA, pp. 13.*

(Continued)

*Primary Examiner* — Chau Nguyen (57) ABSTRACT

To visualize data, an input data set having a plurality of data items is received, and data thinning processing is applied to identify data items of the input data set to deselect from visualizing in a visualization screen. Identifying the data items to deselect is based at least on density of the data items, and on deselection of attributes of the input data set to reduce a number of the attributes to be visualized. After applying the data thinning processing, the data set is presented for display in the visualization screen.

16 Claims, 5 Drawing Sheets
(2 of 5 Drawing Sheet(s) Filed in Color)

U.S. PATENT DOCUMENTS

| | | | |
|---|---|---|---|
| 6,211,880 | B1 | 4/2001 | Impink, Jr. |
| 6,211,887 | B1 | 4/2001 | Meier et al. |
| 6,269,325 | B1 | 7/2001 | Lee et al. |
| 6,314,453 | B1 | 11/2001 | Hao et al. |
| 6,377,287 | B1 | 4/2002 | Hao et al. |
| 6,400,366 | B1 | 6/2002 | Davies et al. |
| 6,429,868 | B1 | 8/2002 | Dehner, Jr. et al. |
| 6,466,946 | B1 | 10/2002 | Mishra et al. |
| 6,502,091 | B1 | 12/2002 | Chundi et al. |
| 6,584,433 | B1 | 6/2003 | Zhang et al. |
| 6,590,577 | B1 | 7/2003 | Yonts |
| 6,603,477 | B1 | 8/2003 | Tittle |
| 6,629,097 | B1 * | 9/2003 | Keith ................................. 1/1 |
| 6,658,358 | B2 | 12/2003 | Hao et al. |
| 6,684,206 | B2 | 1/2004 | Chen et al. |
| 6,727,926 | B1 | 4/2004 | Utsuki et al. |
| 6,934,578 | B2 | 8/2005 | Ramseth |
| 7,020,869 | B2 | 3/2006 | Abari et al. |
| 7,202,868 | B2 | 4/2007 | Hao |
| 7,221,474 | B2 | 5/2007 | Hao et al. |
| 7,313,533 | B2 | 12/2007 | Chang et al. |
| 7,330,573 | B2 * | 2/2008 | Mielekamp .................. 382/128 |
| 7,714,876 | B1 | 5/2010 | Hao |
| 2002/0070953 | A1 * | 6/2002 | Barg et al. ..................... 345/700 |
| 2002/0118193 | A1 | 8/2002 | Halstead, Jr. |
| 2002/0171646 | A1 | 11/2002 | Kandogan |
| 2003/0065546 | A1 | 4/2003 | Goruer et al. |
| 2003/0214504 | A1 * | 11/2003 | Hao et al. ..................... 345/440 |
| 2003/0221005 | A1 | 11/2003 | Betge-Brezetz et al. |
| 2004/0051721 | A1 | 3/2004 | Ramseth |
| 2004/0054294 | A1 | 3/2004 | Ramseth |
| 2004/0054295 | A1 | 3/2004 | Ramseth |
| 2004/0148578 | A1 * | 7/2004 | McConaghy et al. ............ 716/1 |
| 2004/0168115 | A1 | 8/2004 | Bauernschmidt |
| 2004/0210540 | A1 | 10/2004 | Israel et al. |
| 2005/0066026 | A1 | 3/2005 | Chen et al. |
| 2005/0248561 | A1 * | 11/2005 | Ito et al. ....................... 345/419 |
| 2007/0024468 | A1 * | 2/2007 | Quandel et al. ............... 340/968 |
| 2007/0203902 | A1 * | 8/2007 | Bauerle et al. ..................... 707/5 |
| 2007/0225986 | A1 | 9/2007 | Bowe, Jr. et al. |
| 2009/0033664 | A1 | 2/2009 | Hao et al. |

OTHER PUBLICATIONS

Lee et al., "TreePlus: Interactive Exploration of Networks with Enhanced Tree Layouts", IEEE Transactions on Visualization and Computer Graphics, vol. 12, No. 6, Nov./Dec. 2006., pp. 1414-1426.*

M.C. Hao et al., "Visual Mining of E-Customer Behavior Using Pixel Bar Charts," Hewlett-Packard Research Laboratories, pp. 1-7 (2001).

D A. Kein et al, "Recrusive Pattern: A Technique for Visualizing Very Large Amounts of Data," Proceedings of the 6th IEEE Visualization Conference, pp. 279-286 (1995).

A. Aris et al., "Representing Unevenly-Spaced Time Series Data for Visualization and Interactive Exploration," pp. 1-12 (2005).

M. Weber et al., "Visualizing Time-Series on Spirals," pp. 1-6 (2001).

L. Wei et al., "Assumption-Free Anomaly Detection in Time Series," University of California—Riverside, Department of Computer Science & Engineering, pp. 1-4 (2005).

R . Rao et al, http://sigchiong/chi95/proceedings/videos/rr_bdy.htm , pp. 1-4 (at least as early as Jan. 12, 2007).

Deun et al., Multidimensional Scaling, Open and Distance Learning, Jan. 12, 2000 (pp. 1-16).

http://www.pavis.org/essay/multidimensional_scaling.html, 2001 Wojciech Basalaj, (pp. 1-30).

B. Shneiderman, "Tree Visualization with Treemaps: a 2-D Space-Filling Approach", pp. 1-10, Jun. 1991.

Daniel Keim et al "Designing Pixel-Orientated Visualization Techniques: Theory and Applications" IEEE Transactions on Visualization and Computer Graphics, vol. 6, No. 1, Jan.-Mar. 2000, pp. 59-78.

U.S. Appl. No. 11/523,240 entitled "Time Relevance-Based Visualization of Data" filed on Sep. 19, 2006, pp. 1-22.

* cited by examiner

| | A | B | C | D | E | F | G | H | I | J | K | L | M | N |
|---|---|---|---|---|---|---|---|---|---|---|---|---|---|---|
| 1 | BUSINESS GROUP | COST | DURATION | EMPLOYEE | CARD NUMBER | UNIT NAME | TO NUMBER | CALL TYPE | | | | | | |
| 2 | TECHNOLOGY SOLUTION | 0.07 | 2 | 1000 | | | | | | | | | | |
| 3 | TECHNOLOGY SOLUTION | 1.18 | 28 | 1000 | | | | | | | | | | |
| 4 | IMAGING & PRINTING | 0.04 | 1 | 2000 | | | | | | | | | | |
| 5 | IMAGING & PRINTING | 0.08 | 2 | 3000 | | | | | | | | | | |
| 6 | IMAGING & PRINTING | 0.13 | 3 | 3000 | | | | | | | | | | |
| 7 | IMAGING & PRINTING | 0.97 | 23 | 3000 | | | | | | | | | | |
| 8 | IMAGING & PRINTING | 0.04 | 1 | 3000 | | | | | | | | | | |
| 9 | IMAGING & PRINTING | 0.04 | 1 | 3000 | | | | | | | | | | |
| 10 | IMAGING & PRINTING | 0.07 | 2 | 3000 | | | | | | | | | | |
| 11 | IMAGING & PRINTING | 0.44 | 12 | 3000 | | | | | | | | | | |
| 12 | IMAGING & PRINTING | 0.26 | 7 | 3000 | | | | | | | | | | |
| 13 | IMAGING & PRINTING | 0.52 | 14 | 3000 | | | | | | | | | | |
| 14 | IMAGING & PRINTING | 0.76 | 4 | 3000 | | | | | | | | | | |
| 15 | IMAGING & PRINTING | 1.33 | 7 | 3000 | | | | | | | | | | |
| 16 | IMAGING & PRINTING | 0.76 | 4 | 3000 | | | | | | | | | | |

APPLYING DATA THINNING PROCESSING TO A DATA SET FOR VISUALIZATION

BACKGROUND

The storage capacity of storage devices have increased dramatically to allow storage devices to store vast amounts of data. An enterprise (such as a business, government agency, or educational organization) can collect data regarding various aspects of the enterprise such that the data can be analyzed to provide feedback regarding information of interest to the enterprise (such as purchase habits of customers, customer complaint patterns, network performance, storage system performance, and so forth).

In some scenarios, a user may desire to visually analyze collected data sets to better understand some aspect of the enterprise or to make enterprise-related decisions. However, a collected data set can be very large, making traditional visualization techniques impractical. Examples of traditional visualization techniques include presenting data in numeric tables, charts, maps, and so forth.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Some embodiments of the invention are described with respect to the following figures.

DETAILED DESCRIPTION

In accordance with some embodiments, a thinning technique is applied to reduce an input data set such that visualization of the thinned data set is made more effective for a user. The thinning technique includes horizontal thinning and vertical thinning. With horizontal thinning, an input data set is first divided into a set of attribute arrays, where each attribute array corresponds to a respective attribute. Then, to perform the horizontal thinning, some of the attribute arrays can be removed (deselected) such that the number of attributes for visualization is decreased. The removed (deselected) attribute arrays are thus not part of the visualization. Note that deselecting attribute arrays does not mean that the attributes are removed from the input data set—it just means that what is being visualized is a thinned aspect of the input data set. A user can later re-select an attribute (of the input data set) that was previously deselected for visualizing.

Vertical thinning takes into account the relevance factor (e.g., importance) of data items (of the data set) and the density distribution of data items. Effectively, the vertical thinning mechanism either combines or removes data items that have relatively low relevance (e.g., importance) and relatively high density. Thus, low relevance/high density data items are "filtered out" (combined or removed). High density data items refer to a relatively large group of data items that share the same or close (within a predefined range) data values. The relevance factor of data items refers to a parameter that indicates how interesting the data items are, or indicates the usefulness of the data items, or indicates how related or appropriate data items are for a particular purpose. One example of a relevance factor is the importance of data items.

The thinned data set (produced from the horizontal and/or vertical thinning) is then visualized by displaying the thinned data set in a visualization screen. In some implementations, the visualization screen can display a pixel bar chart (a chart having multiple bars corresponding to different groups of data values). In some implementations, the pixel bar charts are in color, where different colors are assigned to different data values. In other implementations, other visual indicators are assigned to the pixels according to respective data values. By reducing the number of attributes and filtering out data items that have low relevance and high density, the visibility of more relevant information is enhanced so that a user can better understand the visualization.

Figure 1:
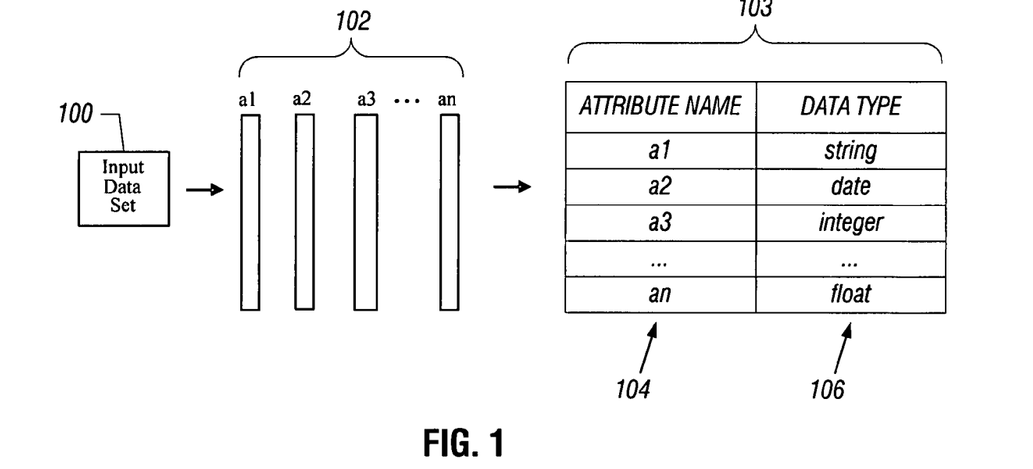
FIG. 1 illustrates transforming an input data set into a multiple attribute data array representation, in accordance with an embodiment.

FIG. 1 shows the transformation of an input data set 100 into a set 102 of multiple attribute arrays. The input data set 100 can include data collected by an enterprise (e.g., a business, a government agency, an educational organization) for various reasons, such as to analyze customer purchase habits, customer complaints, network performance, storage system performance, and so forth. The collected data includes various attributes. Examples of attributes include cost, customer gender, division within an enterprise, revenue, profit, utilization of resources, and so forth. Basically, an attribute describes some characteristic of the enterprise that is of interest to the enterprise or to some user.

The input data set 100 can be in the form of a table, such as a database relational table, with rows and columns. The columns can thus correspond to the attributes, while the multiple rows correspond to multiple records containing the attributes.

The set 102 of multiple attribute arrays, where the set 102 is referred to as A, includes arrays a1, a2, a3 . . . an, where n represents the number of attributes in the input data set 100. Thus, each array ai, where i=1 to n, includes multiple entries corresponding to the rows of the input data set 100. Each array ai represents a corresponding unique attribute of the input data set. The input data set 100 is partitioned as follows: D={A, R}, where A is the set of attribute arrays a1, a2, a3 . . . an, and R is a collection of the records (e.g., rows) in A. The attribute arrays a1, a2, . . . , an are indexed by the attribute names.

The set 102 of attribute arrays is subject to horizontal thinning by a thinning mechanism in accordance with an embodiment. Horizontal thinning refers to the deselection of one or more of the attribute arrays a1, a2, a3 . . . an, to reduce the number of attributes that are to be visualized at a subsequent stage. As part of the horizontal thinning, the data type of each attribute is classified. A main attribute list 103 is then constructed that correlates attribute names 104 to respective data types (or primitives) 106. In the example depicted in FIG. 1, the main attribute list 103 is in the form of a table having two columns, where the first column 104 contains the attribute names, and the second column 106 contains corresponding data types. In the example of FIG. 1, attribute a1 is of the string data type, attribute a2 is of the date data type, attribute a3 is of the integer data type, and attribute an is of the float data type.

In accordance with some embodiments, to improve efficiency, the classification of data types of the attributes can be performed without having to read the entire input data set 100, which can be large. Rather, the records of the input data set 100 can be sampled (such as by using random sampling), and the classification can be based on the sampled data records. Sampling refers to reading less than the entire input data set 100. Random sampling refers to randomly selecting samples of the records. Generating the main attribute list 103 that maps attribute names to data types can help a user decide which attributes are of interest to select for visualization.

Also, by identifying data types and ranges of values for each data type, the system can perform efficient allocation of storage (e.g., memory) to store data according to the data types. For example, integers can be stored with 2-byte or 4-byte data structures, which are more efficient than if 8-byte or 16-byte data structure were used to store integers.

Figure 2:
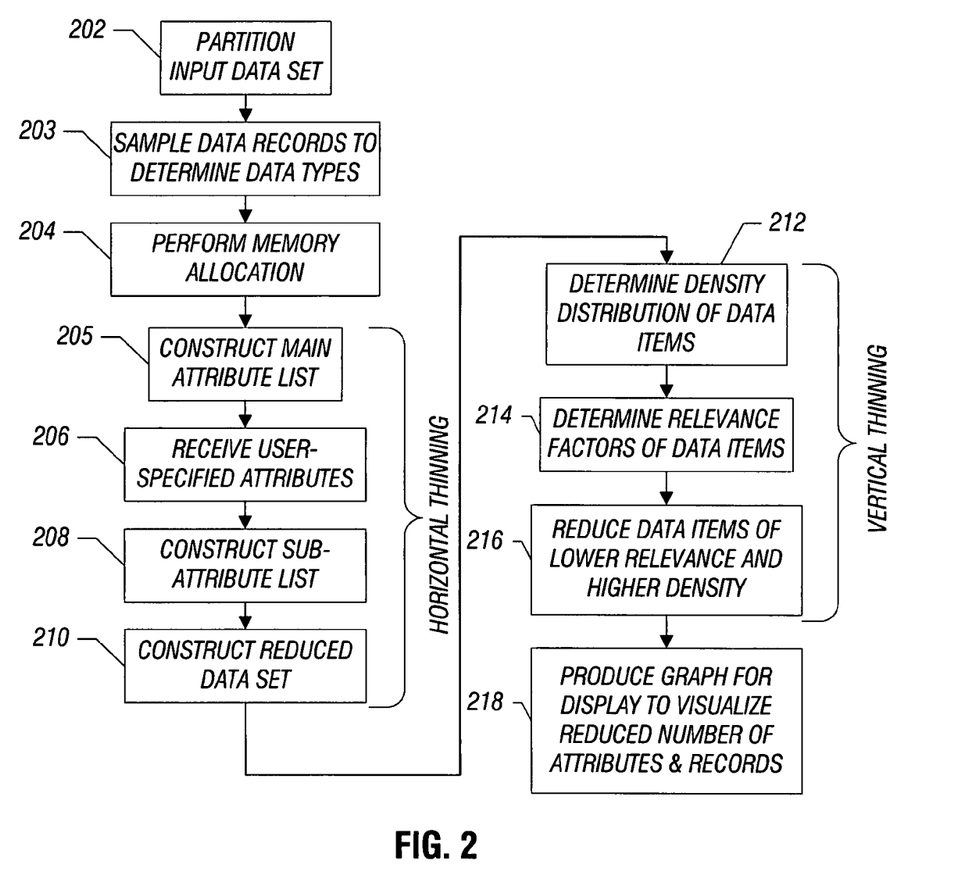
FIG. 2 is a flow diagram of a process of thinning an input data set, according to an embodiment.

FIG. 2 is a flow diagram of a process of thinning an input data set, according to an embodiment, as performed by a thinning module (which can be a software module executable in a computer). The thinning module first partitions (at 202) the input data set (e.g., input data set 100 in FIG. 1) into a set of multiple attribute arrays (e.g., such as set 102 in FIG. 1). Sampling of the records of the input data set is then performed (at 203) to enable the determination of the data type for each attribute. Based on the data types and ranges of values for each data type, memory allocation can be performed (at 204) for each attribute.

Next, a main attribute list (e.g., attribute list 103 in FIG. 1) is then constructed (at 205) based on the data record sampling and data type determination discussed above. Next, the thinning module receives (at 206) user-specified attributes, which can be attributes that are of interest to the user, or attributes that are not of interest to the user. Selection of attributes of interest and attributes not of interest can be based in part on the main attribute list. In response to the user-specified attributes, the thinning module constructs (at 208) a sub-attribute list that reduces the number of attribute arrays to process. The sub-attribute list includes a smaller number of attributes than the main attribute list.

Based on the sub-attribute list, a reduced data set is constructed (at 210), where the reduced data set is represented as $G=\{A_s, R\}$, where $A_s$ is a subset of A; in other words, $A_s$ is a reduced set of attribute arrays. After application of horizontal thinning, the input data set $D=\{A, R\}$ has been reduced to $G=\{A_s, R\}$. Further processing based on the reduced data set G instead of the original input data set D reduces processing and storage loads. Reduced processing and storage loads allow for a user to more efficiently interact with the data items, such as by drilling down to retrieve more detailed information regarding the data items, and to dynamically select different attributes for horizontal thinning purposes. The tasks 204, 206, 208, and 210 of FIG. 2 make up horizontal thinning according to an embodiment.

Next, the thinning module performs vertical thinning (tasks 212, 214, and 216 of FIG. 2) of R that is based on the relevance factor and data density of data items. If R includes a set of records, $\{r1, r2, \ldots, rm\}$ (in other words, the input data set D includes m data records), then vertical thinning reduces the number of such records. The thinning module determines (at 212) the density distribution of the data items. To calculate the density distribution, the data items for each attribute of A, are segregated according to their data values such that data items having the same data values (or range of data values) are grouped together. Large groups of data items having the same data values (or range of data values) are considered to have a higher density than smaller groups of data items sharing the same data values (or range of data values).

The thinning module also determines (at 214) relevance factors of the data items, where the relevance factors can be based on one or more criteria. For example, one such criterion is based on whether data items have less than or greater than a particular threshold value. For example, if the attribute considered is a cost attribute, then the relevance factor of cost data items can be based on whether the data items have cost values less than a particular threshold cost, such as $1.00. In other words, data items having cost values less than $1.00 would be considered to have a relatively low relevance factor (e.g., lower importance). Data items with cost values greater than $1.00 would be considered to have higher relevance (e.g., higher importance).

Candidate data items for vertical thinning are those data items associated with relatively low relevance and high density. Thus, in one example, if there are a large number of data items having cost values less than $1.00, then these data items can be reduced or removed (at 216) for purposes of visualization so that the remaining data items can be more easily detectable in a visualization screen.

Next, a visualization module (which can also be a software module executable in a computer) is used to produce (at 218) a graph to present for display in a visualization screen, where the graph provides a visualization of the reduced number of attributes and records resulting from the horizontal thinning and vertical thinning. In one embodiment, the graph can be in the form of a pixel bar chart, such as the pixel bar charts depicted in FIGS. 4 and 5. In other embodiments, other forms of visualization can be employed.

In some embodiments, the horizontal and vertical thinning procedures can be repeated to enable dynamic analysis of large input data sets from different perspectives (by selecting different attributes for horizontal thinning and using different criteria for vertical thinning). Thus, both the number of attribute arrays and number of data records in the attribute arrays can be increased or reduced dynamically by the user.

The repeating of the horizontal and vertical thinning allows a user to find data distributions, patterns, and outliers (outliers are data values that deviate by greater than some threshold from the remainder of the data values). By using horizontal thinning, multiple scalable views of selected attributes can be constructed and visualized. In other words, the multiple views can include a first view of a first subset of attributes, a second view of a second subset of attributes, and so forth. Un-selected attributes are not included in the analysis. Moreover, the use of vertical thinning reduces the amount of low relevance data items.

Figure 3:
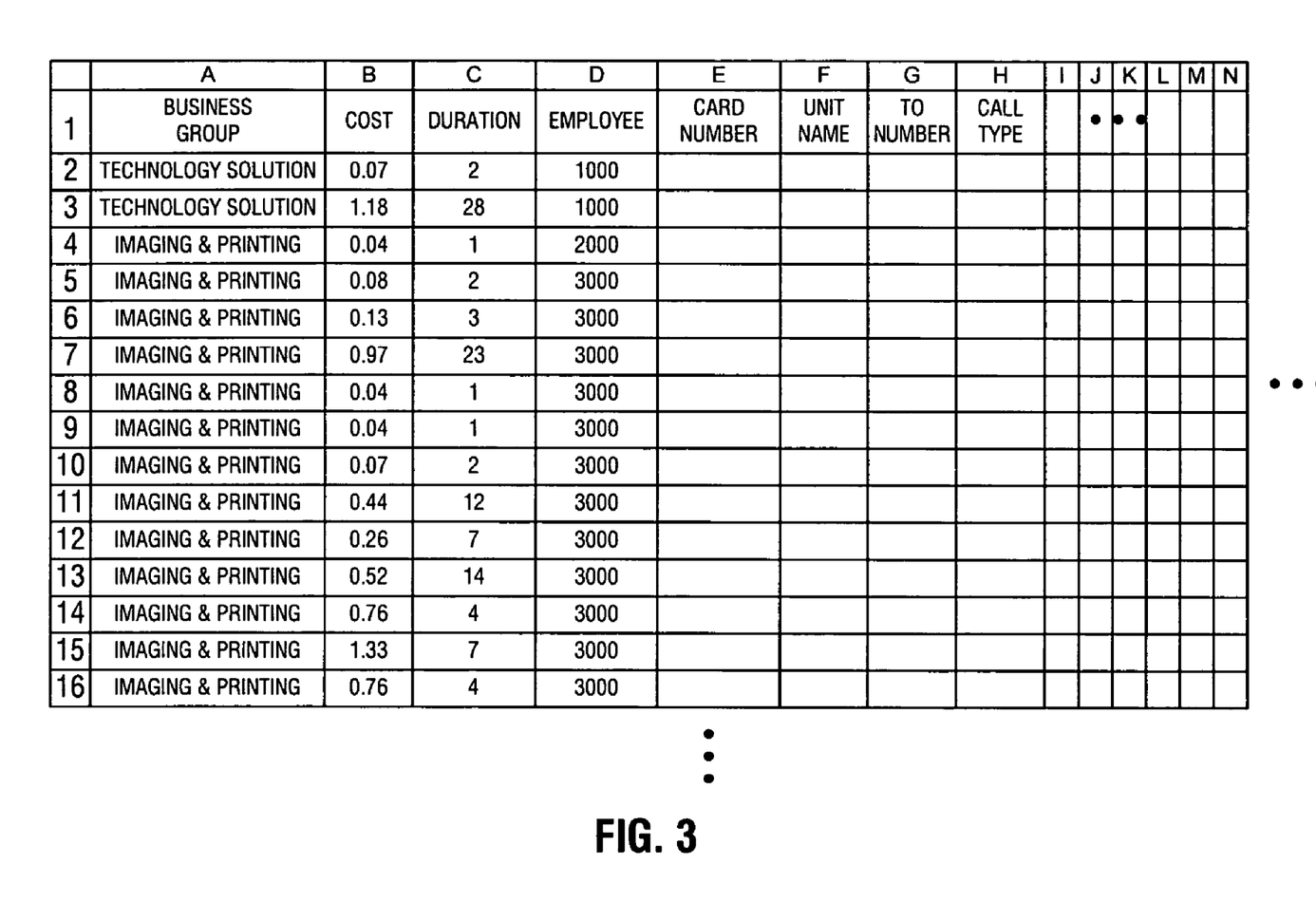
FIG. 3 illustrates an example input data set that is to be thinned, in accordance with an embodiment.

FIG. 3 shows an example input data set, which is in the form of a table having rows and columns. In the example of FIG. 3, the data collected relate to telephone calls made by employees of a particular business. Column A in the table of FIG. 3 is a first attribute that identifies various groups of the business. Column B relates to the cost attribute, which represents the cost of the corresponding telephone call. Column C of the table of FIG. 3 contains the duration attribute, which indicates the duration of the call. Column D of the table of FIG. 3 contains the employee identifier attribute to identify the employee who made the call. The remaining columns of the table of FIG. 3 contain other attributes.

The input data set of FIG. 3 can be partitioned into multiple attribute arrays, in the manner discussed, where each attribute array includes records in a corresponding column of the table of FIG. 3. By applying horizontal thinning on the attribute arrays, the number of attributes that are to be visualized can be reduced. In one example, everything except the business group and cost attributes (in columns A and B of the table of FIG. 3) can be eliminated (deselected) such that the remaining attributes are not visualized. Selection of the business group and cost attributes can be made pursuant to user input.

Figure 4:
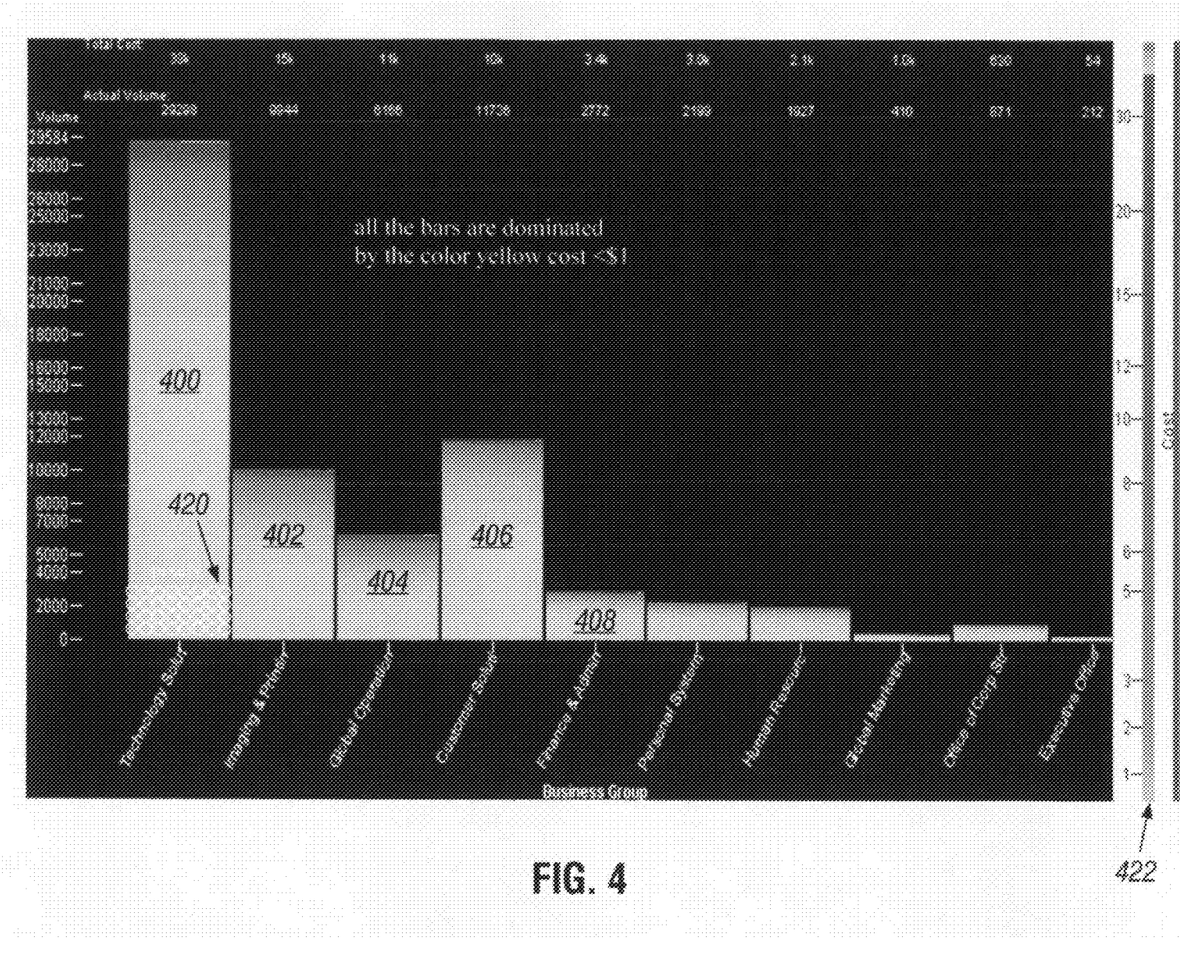
FIGS. 4 and 5 illustrate visualization screens to display thinned data sets, in accordance with some embodiments.

FIG. 4 depicts a pixel bar chart that visualizes data items for the business group and cost attributes after the horizontal thinning has been applied on the input data set depicted in FIG. 3. The pixel bar chart is a two-dimensional chart that has a horizontal dimension and a vertical dimension. The horizontal dimension of the pixel bar chart depicted in FIG. 4 lists the various business groups associated with the business group attribute. The listed business groups include technology solutions, imaging and printing, global operation, customer solution, and so forth. Each bar is filled with pixels, which in the example represent corresponding telephone call records. The vertical dimension of the pixel bar chart represents the volume of telephone calls associated with each business group. For example, a first bar 400 of the pixel bar chart represents 29,298 actual telephone calls made by employees of the technology solution business group, while a second bar 402 represents 9,944 telephone calls made by the imaging and printing business group. Within each of the bars 400, 402, 404, 406, 408, and so forth, depicted in FIG. 4, an array of pixels 420 are provided. The pixels 420 within each bar 400, 402 and so forth, represent corresponding cost data values of the cost attribute. Each pixel thus represents a corresponding telephone call record, and the color assigned to each pixel represents the cost of the corresponding telephone call record. In the example of FIG. 4, the pixel bar chart is a color pixel bar chart where different data values of the cost attribute have different colors. A color scale 422 is provided on the right side of the pixel bar chart to correlate cost values to different colors. At the lower end of the color scale 422, cost values below $1.00 have a relatively light green color. The upper end of the cost scale 422 indicates that high cost values are associated with the red color. Other colors between light green and dark red are provided for other cost values, as indicated by the color scale 422.

The array of pixels 420 in each bar of the pixel bar chart are sorted by the cost attribute. For example, in one embodiment, the lower left corner of the bar 400 includes a pixel for the lowest cost value, whereas the upper right corner of the bar 400 contains a pixel for the highest cost value. Thus, the array of pixels 420 in the bar 400 are sorted by the cost values from left to right and from bottom to top. This sorting is indicated by the gradual shifting between different colors as the cost values of the pixels increase from left to right and from bottom to top of the bar 400. Note that the lower portion of the bar 400 has the light green color associated with low cost values, whereas the upper portion of the bar 400 have the deeper colors associated with higher cost values.

From the example of FIG. 4, it is apparent that there is a high density of data items with low cost values. If the relevance of a data item is defined by the cost of the data item (e.g., data items having cost values less then $1.00 have low relevance or importance), then the data items associated with cost values less than $1.00 are candidates for removal or reduction to provide additional space in the pixel bar chart for the more relevant and lower density data items in the respective bars of the pixel bar chart.

Figure 5:
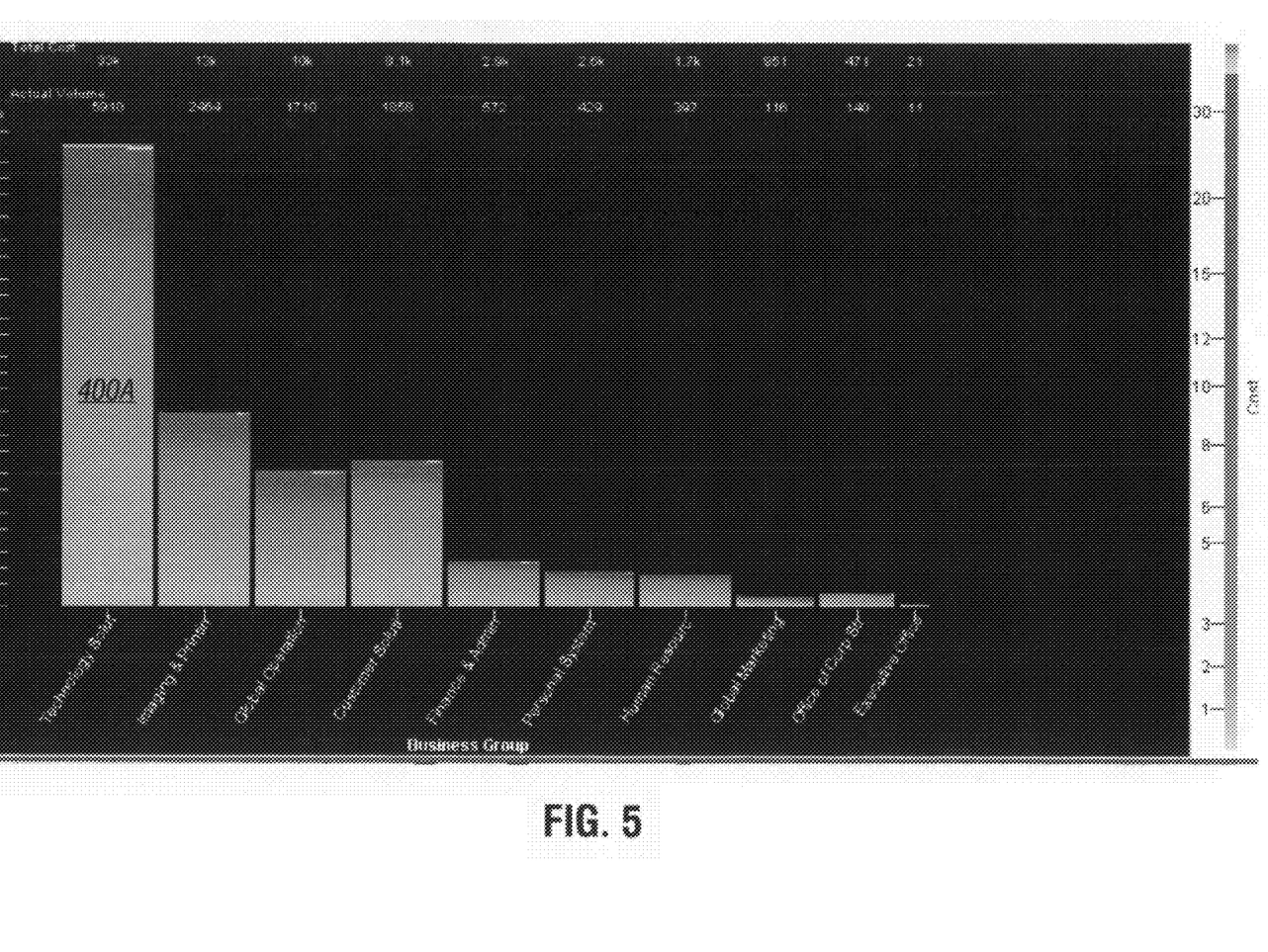

After vertical thinning has been applied, the number of records is reduced by removing data items having low cost values (e.g., lower than $1.00). As depicted in FIG. 5, bar 400A (for the technology solution business group) does not contain any pixels for data items with cost values less than $1.00. As a result, the data items with the higher cost values are more easily detectable in the bar 400A (as compared to the bar 400 in FIG. 4). The remaining bars of the pixel bar chart of FIG. 5 have similar improved resolution.

Visualization screens according to some embodiments allow a user to select different parts or points of the visualization screens to drill down for more detailed information in areas of interest. For example, a user can use an input device to click on a pixel, or to perform a rubber-band selection of a group of pixels, to cause a pop-up screen to display further information about the pixel or group of pixels.

Figure 6:
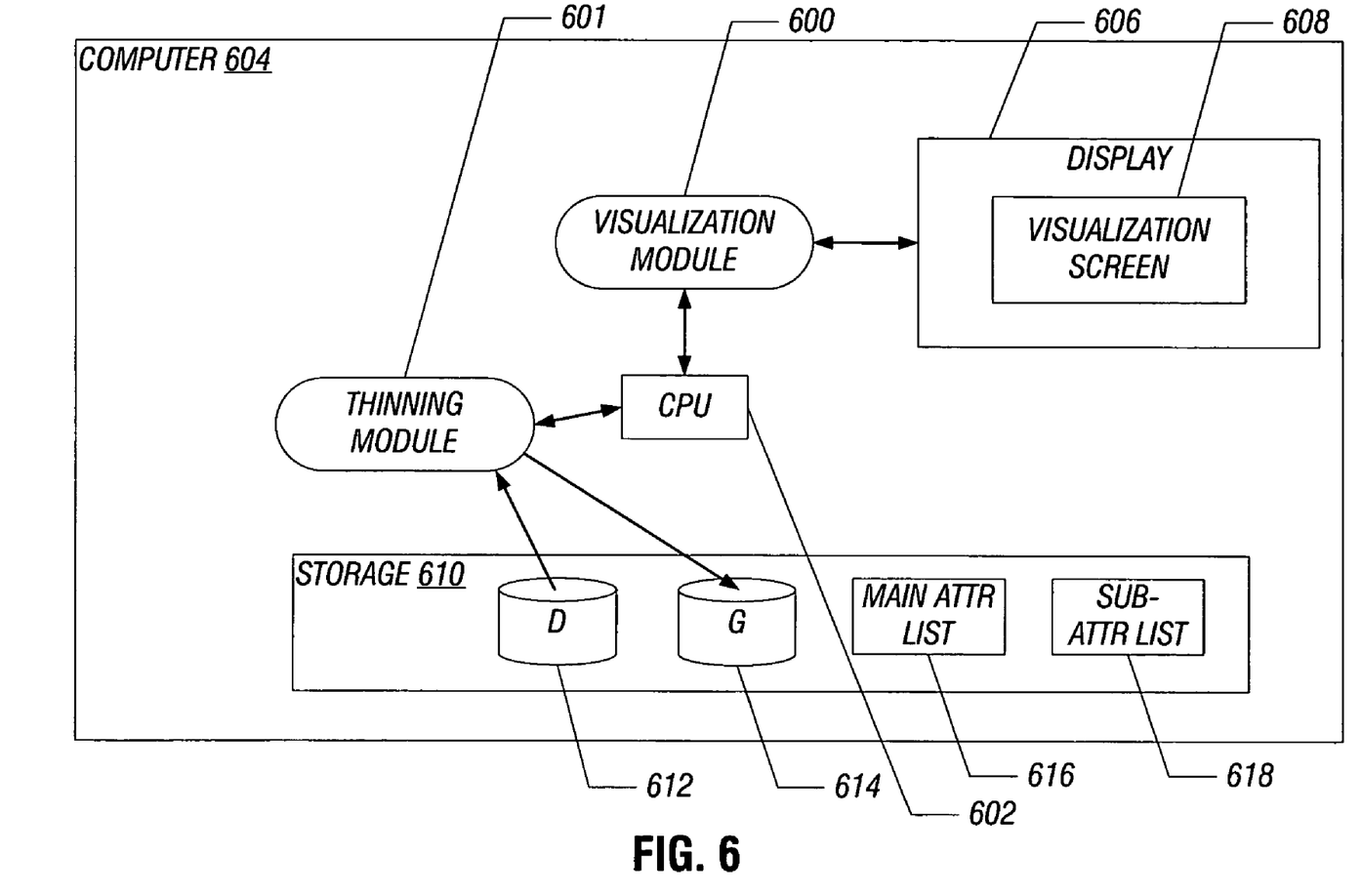
FIG. 6 is a block diagram of an example computer in which visualization module and a thinning module according to an embodiment are executable.

FIG. 6 depicts a computer 604 having a visualization software module 600 and a thinning software module 601 to perform various tasks discussed above. The visualization module 600 and thinning module 601 are executable on one or more central processing units (CPUs) 602 of the computer 604.

The computer 604 further includes a display device 606 that can display a visualization screen 608 associated with the visualization module 600. The computer 604 further includes a storage 610 for storing an input data set 612 that is provided to the thinning module 601. The thinning module 601 applies horizontal and/or vertical thinning on the input data set 612 to provide a thinned data set 614, which is also stored in the storage 610. The storage 610 is also used to store a main attribute list 616 and a sub-attribute list 618, as discussed above.

Although the display device 606 and input data set 612 are depicted as being part of the computer 604, the display device 606 and input data set 612 can actually be remotely located from the computer 604 in other implementations. For example, the visualization module 600 and thinning module 601 can be executable on a server computer, whereas the actual visualization can be performed at a remote client computer. Also, the input data set 612 can be part of a database that is stored in a remote database server that is located somewhere in a network.

Instructions of software described above (including the thinning module 601 and visualization module 600 of FIG. 6) are loaded for execution on a processor (such as one or more CPUs 602 in FIG. 6). The processor includes microprocessors, microcontrollers, processor modules or subsystems (including one or more microprocessors or microcontrollers), or other control or computing devices. A "processor" can refer to either a single processor component or multiple processor components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method executed by a computer for visualizing data, comprising:
   receiving, by the computer, an input data set having a plurality of data items;
   determining, by the computer, a density distribution of the data items to identify groups of the data items having data values within respective predefined ranges;
   determining, by the computer, relevance factors for the data items, wherein determining the relevance factors comprises comparing data values of the data items to a predefined threshold;
   applying, by the computer, data thinning processing to identify data items in the input data set to deselect from visualizing in a visualization screen, wherein identifying the data items to deselect from visualizing is based at least on density of the data items and on the relevance factors, and on deselection of attributes of the input data set to reduce a number of the attributes to be visualized, wherein identifying the data items to deselect from visualizing based on the density comprises identifying, to deselect from visualizing, at least one of the groups of the data items with a higher density than another group, wherein identifying the data items to deselect based on the relevance factors comprises deselecting the data items having data values with a predefined relationship with respect to the predefined threshold, wherein the data items with the predefined relationship with respect to the predefined threshold are lower relevance data items; and
   presenting, by the computer, for display in the visualization screen, the input data set after applying the data thinning processing.

2. The method of claim 1, wherein the deselection of attributes from visualizing is in response to user selection.

3. The method of claim 2, further comprising:
   mapping the attributes to respective data types to enable user selection for deselecting the attributes based on the data types.

4. The method of claim 3, further comprising sampling the data items of the input data set to perform the mapping.

5. The method of claim 1, further comprising:
   sampling the data items of the input data set; and
   determining data types of the attributes based on the sampling.

6. The method of claim 1, further comprising partitioning the input data set into plural attribute arrays corresponding to plural ones of the attributes, and wherein the deselection of attributes from visualizing comprises deselection of attribute arrays.

7. The method of claim 1, further comprising:
   receiving selection, for visualization, of an attribute that was previously deselected.

8. The method of claim 1, wherein identifying the data items to deselect from visualizing comprises performing horizontal thinning and vertical thinning of the input data set, wherein the horizontal thinning reduces a number of attributes in the input data set for visualizing, and the vertical thinning reduces a number of records in the input data set for visualizing.

9. The method of claim 8, further comprising repeating at least the horizontal thinning to select a different subset of data items to visualize.

10. The method of claim 1, further comprising determining importance of the data items, wherein identifying the data items to deselect from visualizing comprises identifying data items having lower importance and higher density to deselect.

11. The method of claim 1, further comprising generating a graph for display in the visualization screen, wherein the graph comprises a pixel bar chart including plural bars having an array of pixels representing respective data items in the thinned data set.

12. The method of claim 11, wherein generating the graph comprises assigning colors to pixels to represent data values of the corresponding data items in the thinned data set.

13. A method executed by a computer, comprising:
   partitioning, by the computer, an input data set into first elements;
   receiving, by the computer, indications of which of the first elements to select for visualization and which of the first elements to deselect for visualization;
   producing plural different views of respective subsets of the input data set based on the received indications, wherein the views include arrays of pixels assigned corresponding visual indicators based on data values represented by the pixels; and
   filtering out, by the computer, data items based on density and relevance of the data items to reduce an amount of data items to display in the views, wherein filtering out data items based on density and relevance comprises:
      determining relative densities of groups of the data items, wherein each of the groups has corresponding data items with data values within a respective predefined range, and
      determining the relevance of the data items in each of the groups by comparing the data items in each corresponding group to a predefined threshold,
      wherein filtering out the data items based on the density comprises filtering out at least one of the groups with a higher density than another group, and wherein filtering out the data items based on the relevance comprises filtering out the data items having lower relevance including the data items having data values with a predefined relationship with respect to the predefined threshold.

14. The method of claim 13, wherein assigning corresponding visual indicators based on data values comprises assigning corresponding colors based on data values.

15. The method of claim 13, wherein partitioning the input data set into the first elements comprises partitioning the input data set into plural attribute arrays.

16. A computer-readable storage medium storing instructions that when executed cause a computer to:
   receive an input data set having a plurality of data items;
   applying data thinning processing to identify data items in the input data set to deselect from visualizing in a visualization screen, wherein identifying the data items to deselect from visualizing is based at least on density and relevance of the data items, and on deselection of attributes of the input data set to reduce a number of the attributes to be visualized, wherein deselecting from visualizing based on the density and relevance comprises:
   determining relative densities of groups of the data items, wherein each of the groups has corresponding data items with values within a respective predefined range, and
   determining the relevance of the data items in each of the groups by comparing the data items in each corresponding group to a predefined threshold, wherein deselecting from visualizing based on the density comprises deselecting from visualizing at least one of the groups with a higher density than another group, and wherein deselecting from visualizing based on the relevance comprises deselecting the data items having data values with a predefined relationship with respect to the predefined threshold, wherein the data items with the predefined relationship with respect to the predefined threshold are lower relevance data items; and presenting, for display in the visualization screen, the input data set after applying the data thinning processing.

* * * * *